United States Patent
Asplund et al.

(10) Patent No.: US 10,886,982 B2
(45) Date of Patent: Jan. 5, 2021

(54) METHOD AND NETWORK NODE FOR SELECTING CODEBOOK

(71) Applicant: Telefonaktiebolaget LM Ericsson (publ), Stockholm (SE)

(72) Inventors: Henrik Asplund, Stockholm (SE); Martin Johansson, Mölndal (SE); Andreas Nilsson, Gothenburg (SE); Claes Tidestav, Bålsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/082,148

(22) PCT Filed: Mar. 9, 2016

(86) PCT No.: PCT/EP2016/055008
§ 371 (c)(1),
(2) Date: Sep. 4, 2018

(87) PCT Pub. No.: WO2017/152968
PCT Pub. Date: Sep. 14, 2017

(65) Prior Publication Data
US 2019/0097697 A1    Mar. 28, 2019

(51) Int. Cl.
*H04B 7/06* (2006.01)
*H04B 7/0456* (2017.01)
(Continued)

(52) U.S. Cl.
CPC ......... *H04B 7/0456* (2013.01); *H04B 7/0452* (2013.01); *H04B 7/0617* (2013.01);
(Continued)

(58) Field of Classification Search
CPC .. H03M 7/00; H04B 7/00; H04B 7/02; H04B 7/04; H04B 7/06; H04B 7/417;
(Continued)

(56) References Cited

U.S. PATENT DOCUMENTS

2009/0046801 A1    2/2009  Pan et al.
2009/0128381 A1    5/2009  Choi et al.
(Continued)

OTHER PUBLICATIONS

International Search Report and Written Opinion for International Application No. PCT/EP2016/055008, filed on Mar. 9, 2016, consisting of 10-pages.

*Primary Examiner* — Shawkat M Ali
(74) *Attorney, Agent, or Firm* — Christopher & Weisberg, P.A.

(57) ABSTRACT

A method of selecting a codebook is disclosed. The method is performed in a network node and includes: determining whether to use single-user multiple-input-multiple output, SU-MIMO, or multi-user multiple-input-multiple output, MU-MIMO, in a cell (C1) controlled by the network node, and selecting, based on the determining, a first codebook or a second codebook for use in communication with a communication device within the cell (C1). The first codebook is configured for SU-MIMO communication and the second codebook is configured for MU-MIMO communication. A network node, computer program and computer program product are also disclosed.

15 Claims, 2 Drawing Sheets

(51) Int. Cl.
*H04B 7/0452* (2017.01)
*H04J 11/00* (2006.01)

(52) U.S. Cl.
CPC ........ *H04B 7/0639* (2013.01); *H04J 11/0026* (2013.01); *H04J 11/0063* (2013.01)

(58) Field of Classification Search
CPC .. H04B 7/0452; H04B 7/0456; H04B 7/0488; H04B 7/0617; H04B 7/0632; H04B 7/0639; H04B 7/0697; H04J 11/00; H04J 11/0026; H04J 11/0063; H04L 1/02; H04L 1/0023; H04L 1/0026; H04L 12/26; H04L 25/03343; H04L 27/00; H04L 27/28; H04W 24/00; H04W 72/10
USPC ......... 341/106; 370/252, 335; 375/219, 260, 375/267, 295, 316, 349
See application file for complete search history.

(56) References Cited

U.S. PATENT DOCUMENTS

| | | | |
|---|---|---|---|
| 2009/0323849 A1* | 12/2009 | Bala | H04B 7/0417 375/267 |
| 2010/0311353 A1* | 12/2010 | Teillet | H01Q 21/08 455/84 |
| 2011/0194504 A1* | 8/2011 | Gorokhov | H04B 7/0417 370/329 |
| 2011/0200131 A1 | 8/2011 | Gao et al. | |
| 2015/0200455 A1* | 7/2015 | Venkateswaran | H01Q 1/246 342/372 |
| 2016/0241317 A1* | 8/2016 | Piazzi | H04B 7/0456 |

\* cited by examiner

US 10,886,982 B2

METHOD AND NETWORK NODE FOR SELECTING CODEBOOK

CROSS-REFERENCE TO RELATED APPLICATIONS

This application is a Submission Under 35 U.S.C. § 371 for U.S. National Stage Patent Application of International Application Number: PCT/EP2016/055008, filed Mar. 9, 2016 entitled "A METHOD AND NETWORK NODE FOR SELECTING CODEBOOK," the entirety of which is incorporated herein by reference.

TECHNICAL FIELD

The technology disclosed herein relates generally to the field of Multiple Input Multiple Output MIMO technology and precoding, and in particular to a method, network node, computer program and computer program products for selecting codebook.

BACKGROUND

In Multiple Input Multiple Output (MIMO) technology radio signals are sent and received using multiple antenna elements. Beamforming is a signal processing technique that can be combined with MIMO for controlling the directionality of the radio signals. Each individual radio signal transmitted from or received by a respective antenna element is weighted in view of amplitude and phase in order to obtain the desired directionality. A beamformer applies the weighting to e.g. a transmit signal by shifting the phase and setting the amplitude of each antenna element of an antenna array accordingly. Typically, the radio signals are weighted so that they are added constructively in the direction of the transmitter/receiver and destructively in the direction of interferers. The weightings can be determined e.g. by using channel estimation.

Precoding is one type of beamforming. In closed loop MIMO precoding, each of the multiple signals, or streams, are emitted from the transmit antennas at the transmitter (e.g. base station) with appropriate weighting per each antenna such that the throughput is maximized between the base station and the receiver, e.g. a user equipment (UE).

Two different MIMO schemes are included in the LTE standard: single-user MIMO (SU-MIMO) and multi-user MIMO (MU-MIMO). In downlink, SU-MIMO means that MIMO is applied between one base station and one UE (where both the base station and the UE have multiple antennas), while MU-MIMO means that MIMO is applied between one base station and multiple UEs (where the base station have multiple antennas and the UEs have one or more antennas). For MU-MIMO, two or more UEs will be scheduled on the same time-frequency resources within the same cell, while for SU-MIMO there is only one user per time-frequency resource per cell. In order to get enough orthogonality between multiple MU-MIMO users the spatial correlation between the users need to be low, i.e., the channels to the involved UEs should be sufficiently different to enable error free decoding of each message.

Interference is a general problem within wireless communication systems, and needs to be considered also for the case of directional transmissions, e.g. when using precoding.

SUMMARY

An objective of the present invention is to address the above mentioned need and to improve on interference situation in communication systems, in particular for SU-MIMO and MU-MIMO scenarios. This objective, and others, are achieved by the method, network node, computer programs and computer program products according to the appended independent claims, and by the embodiments according to the dependent claims.

The objective is according to an aspect achieved by a method of selecting codebook. The method is performed in a network node and comprises determining whether to use single-user multiple-input-multiple output, SU-MIMO, or multi-user multiple-input-multiple output, MU-MIMO, in a cell controlled by the network node, and selecting, based on the determining, a first codebook or a second codebook for use in communication with a communication device within the cell, wherein the first codebook is adapted for SU-MIMO communication and the second codebook is adapted for MU-MIMO communication.

The method provides a number of advantages. For instance, the method enables an improved performance of communication devices by reducing interference at relevant locations, e.g. reducing interference within the cell in case of MU-MIMO.

The objective is according to an aspect achieved by a computer program for a network node for selecting codebook. The computer program comprises computer program code, which, when executed on at least one processor on the network node causes the network node to perform the method as above.

The objective is according to an aspect achieved by a computer program product comprising a computer program as above and a computer readable means on which the computer program is stored.

The objective is according to an aspect achieved by a network node for selecting codebook. The network node is configured to: determine whether to use single-user multiple-input-multiple output, SU-MIMO, or multi-user multiple-input-multiple output, MU-MIMO, in a cell controlled by the network node, and select, based on the determining, a first codebook or a second codebook for use in communication with a communication device within the cell, wherein the first codebook is adapted for SU-MIMO communication and the second codebook is adapted for MU-MIMO communication.

Further features and advantages of the embodiments of the present teachings will become clear upon reading the following description and the accompanying drawings.

DETAILED DESCRIPTION

Figure 1:
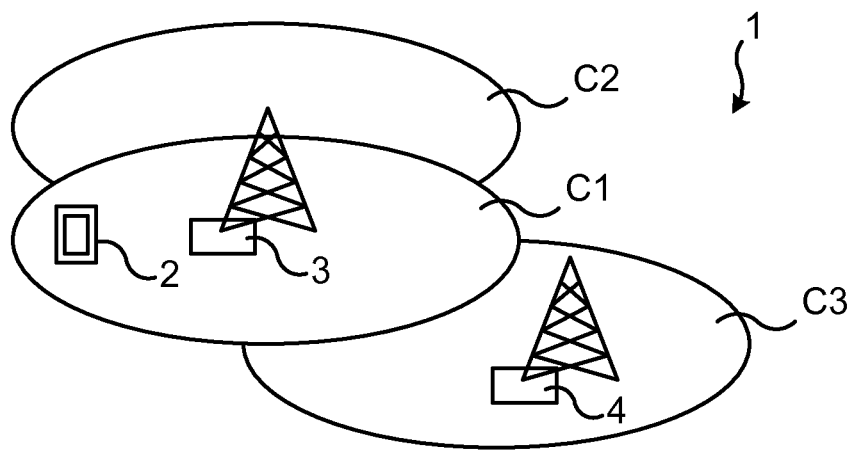
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Precoders have been designed to maximize the received signal energy at the receiver. Additionally, the interference into neighboring cells is to be kept low. However, no consideration has been taken on how the transmissions affect other receivers in the same cell. This is not necessarily an issue for SU-MIMO, for which the precoders and codebooks have traditionally been designed, since there is only one user per radio resource (e.g. time-frequency resource) in the cell. When applying MU-MIMO transmissions in the state of the art, this same precoding codebook design is used. The transmissions that are directed towards one user, using one or several precoders in the codebook, generate interference that affect other users, who receive data simultaneously on the same radio resource, using other precoders in the codebook. The intra-cell interference effect has not been taken into account in the design of codebooks for MU-MIMO, and the transmission to one of the involved UEs may cause significant interference to the other co-scheduled UEs within the same cell, since they are scheduled on the same radio resources.

The above described drawbacks have been identified by the inventors and methods and devices for improving on the situation are provided and described herein.

In order to facilitate a thorough understanding of the present teachings, codebook based precoding is described briefly initially. In closed-loop precoding it is assumed that the network node selects a precoder weight (also denoted precoder matrix) based on feedback from the UE. Thus, the precoding weights are calculated at the UE and the UE then suggests, to the network node, e.g. a base station, which precoding weights should be used. The network node may, but need not, select the precoding weights suggested by the UE. In order to limit such signaling (in uplink as well as in downlink) related to precoding weights, only a limited number of predefined precoding weights are used, referred to as codebook. The codebook is known both at the network node and the UE, so when the UE informs the network node about which set of precoding weights that should be used, the UE only needs to send a number corresponding to the index that the precoding weights have in the codebook. This number is denoted Precoding Matrix Indicator (PMI). A rank indicator may also be sent, which indicates a rank that the UE would like the network to use for the transmission.

FIG. 1 illustrates schematically an environment in which embodiments according to the present teachings may be implemented.

A communication system 1 may comprise a wireless access network, e.g. radio access network (RAN), and a core network. The wireless access network may comprise a number of radio access nodes 3, 4, for which different denotations are used, e.g. base station, evolved NodeB or eNB to mention a few examples. The radio access nodes 3, 4 serve users within respective one or more geographical areas, often denoted cells C1, C2, C3 or sectors. The radio access node 3, 4 each communicates wirelessly with communication devices 2 (exemplified herein by user equipment, UE) residing within their respective coverage area. Each radio access node 3, 4 may control one or more cells.

The core network comprises various network nodes, which nodes may also be denoted in different ways depending e.g. on communication system at hand. In Long Term Evolution (LTE), for instance, the core network may comprise entities such as a Mobility Management Entity (MME) and packet data network gateways (PDN GW), where the latter provides connectivity to e.g. a packet data network (PDN), e.g. Internet.

The communication system 1 may comprise or be connectable to such PDN. The PDN in turn may comprise a server or cluster of servers, e.g. a server of the Internet ("web-server") or any application server. Such server may run various applications, providing services to the users of the UEs 2. It is noted that some embodiments according to the present teachings may be implemented in a distributed manner, wherein different steps are performed by different entities, and may be implemented locally and/or in a centralized component (e.g. in a so called cloud environment). The network node in which a method according to the teachings may be implemented may comprise a server or other entity on the Internet e.g. according to a cloud computing model.

For SU-MIMO, wherein the users within the same cell are scheduled on different time-frequency resources, most of the interference generated from precoding beams affects users in other cells (neighboring cells). This inter-cell interference may be reduced by reducing the side-lobe levels of the precoding beams in directions towards other cells. For MU-MIMO on the other hand, it is of high importance to reduce the spatial intra-cell interference between different precoding beams. One way to do this is to reduce the side-lobe levels of the precoding beams in directions towards the own cell. Based on this realization, it is suggested that different codebooks are used depending on whether SU-MIMO or MU-MIMO is the transmission mode to be used.

Figure 2:
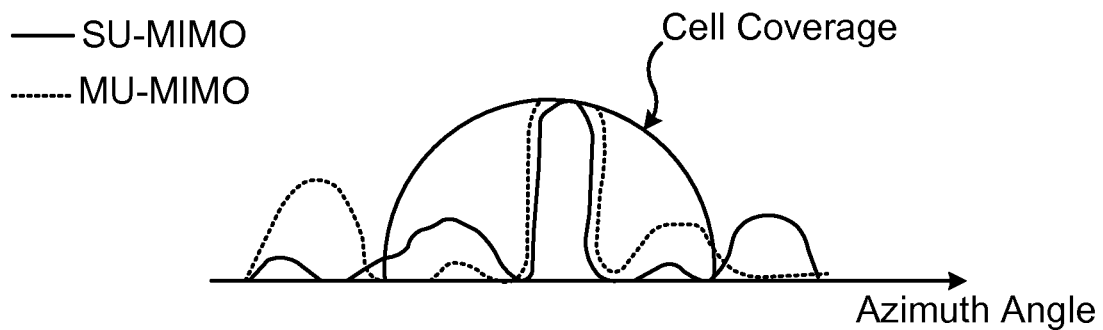
FIG. 2 illustrates a precoding beam with sidelobes for SU-MIMO and MU-MIMO, respectively.

FIG. 2 illustrates a precoding beam with sidelobes for SU-MIMO and MU-MIMO, respectively. Ideally, there would be no sidelobes and all energy would be directed to the intended receiver. FIG. 2 illustrates a schematic example on how a precoding beam may look like for the SU-MIMO case (solid line) and for the MU-MIMO case (dashed line) if using the method suggested herein. As can be seen the SU-MIMO beam (solid line) have low side-lobe levels outside the coverage area of the cell in order to reduce interference to users served by other cells (e.g. within the same site). In contrast, for the MU-MIMO precoding beam (dashed line) the side-lobe level is mainly reduced within the cell in order to reduce intra-cell interference.

Figure 3:
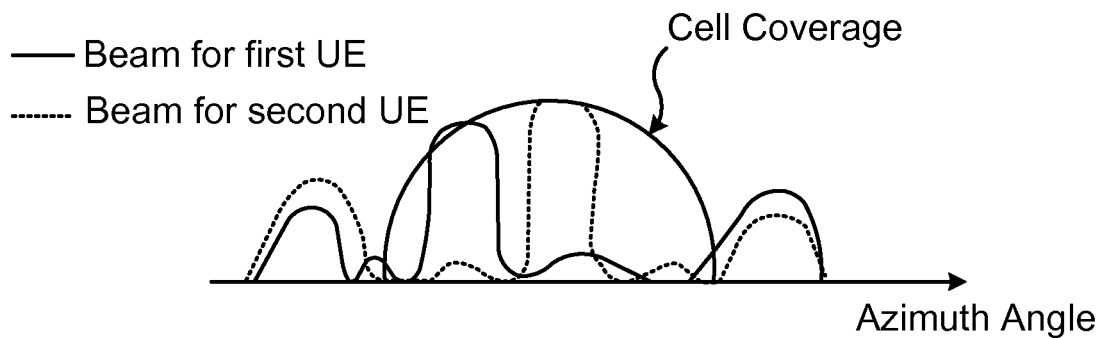
FIG. 3 illustrates two precoding beams with sidelobes for MU-MIMO.

FIG. 3 illustrates two precoding beams with sidelobes for MU-MIMO. The precoding beams in the codebook should be designed individually so that the side-lobes are suppressed in the right directions regardless of the direction of the main beam. FIG. 3 shows an example of this and in particular two schematic precoding beams for MU-MIMO. The precoding beams point in different directions but still suppress the side-lobe in directions of the own cell, i.e. reduces intra-cell interference.

As mentioned, the use of different codebooks is suggested herein. When adapting the codebooks in dependence on transmission mode (SU-MIMO or MU-MIMO), several considerations may be taken into account. The above described different sidelobes for the different scenarios may be taken into account. If using antenna amplitude tapering for the precoding weights, consideration can be taken to the total output power, in particular for maximizing it. In finding the most suitable codebook for the respective scenarios, various optimization algorithms may be used. An algorithm (i.e. a set of instructions) may be used, which aims at finding precoding weights that minimize the sidelobes in a desired direction (e.g. minimizing sidelobes within a current cell for the case of MU-MIMO). The desired shape and position of sidelobes, and in particular corresponding precoding weights, may hence be obtained in different ways, e.g. using different optimization methods.

In one embodiment, the switching of the codebooks is accomplished by first creating one large codebook including both the SU-MIMO and MU-MIMO specific codebooks. Then a codebook subset restriction functionality that exists in the LTE standard from Release 8 may be used to switch between the two codebooks depending on if SU-MIMO or MU-MIMO is used. In another embodiment also a legacy codebook may be included in the large codebook such that it always is possible to go back to using the standard codebook if desired, e.g. for legacy UEs having only a standard codebook.

In another embodiment, the UE can be instructed to report one preferred PMI from each codebook. At the time of transmission, the eNodeB can then freely select between the two codebooks.

In yet another embodiment, the eNodeB may take the instantaneous or average traffic load in neighboring sectors into account when doing the selection between the the SU-MIMO and MU-MIMO codebook. For high load, the eNodeB may then still choose to use the SU-MIMO codebook when applying MU-MIMO to reduce the interference in neighboring sectors.

The various features and embodiments that have been described may be combined in different ways, examples of which are given in the following.

Figure 4:
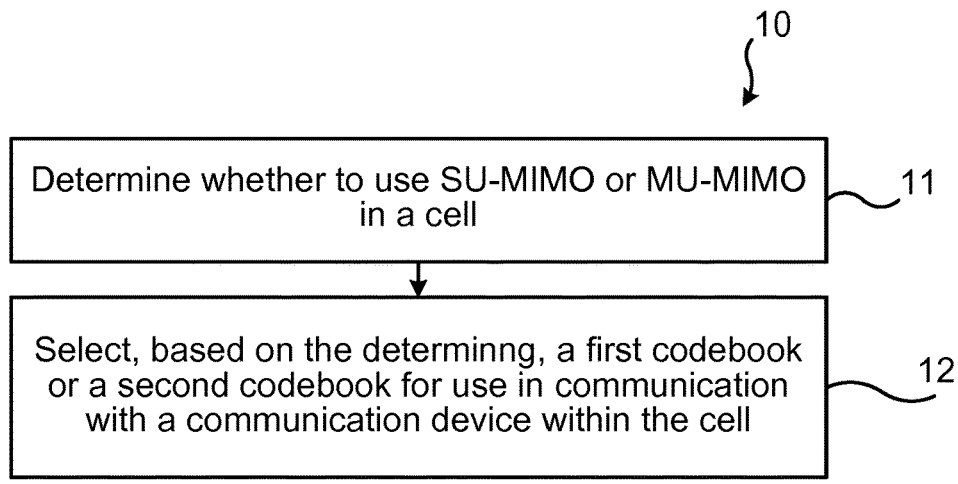
FIG. 4 illustrates a flow chart over steps of an embodiment of a method in a network node in accordance with the present teachings.

FIG. 4 illustrates a flow chart over steps of an embodiment of a method in a network node in accordance with the present teachings. The method 10 of selecting codebook may be performed in a network node 3, e.g. a radio access node or a core network node. The method 10 comprises determining 11 whether to use single-user multiple-input-multiple output, SU-MIMO, or multi-user multiple-input-multiple output, MU-MIMO, in a cell C1 controlled by the network node 3.

The method 10 selecting 12, based on the determining, a first codebook or a second codebook for use in communication with a communication device 2 within the cell C1, wherein the first codebook is adapted for SU-MIMO communication and the second codebook is adapted for MU-MIMO communication.

The first and second codebook are adapted for the SU-MIMO and MU-MIMO, respectively, in view of creating as little interference as possible in view of the transmission mode at hand. For instance, and as has been described, if using a MU-MIMO transmission mode in the cell, the interference between the users residing in the cell should be minimized, while the interference created outside the cell is not as important. The adaptation of the second codebook may then comprise minimizing the sidelobes created by precoding beams that fall within the cell. If instead the SU-MIMO transmission mode is to be used in the cell, the interference between the users in the cell is not as important since they use different radio resources, and the adaptation of the first codebook may then comprise minimizing the sidelobes created by the precoding beams falling outside the cell. The method 10 thereby improves on the interference situation in a communication system compared to using a single codebook, where the design is typically based on a compromise of interference created within the cell and outside the cell. The reduced interference results in improved performance of the communication devices and hence increased user satisfaction.

The use of e.g. the first codebook for communication with the communication device 2 may be interpreted as using a precoder matrix selected from the first codebook, and applying the precoder matrix for processing a signal of the communication.

In an embodiment, the first codebook is adapted for SU-MIMO communication by comprising precoder matrices minimizing sidelobes outside the cell C1.

In an embodiment, the second codebook is adapted for MU-MIMO communication by comprising precoder matrices minimizing sidelobes within the cell C1.

As has been described, the first codebook and second codebooks may be created by using an optimization function, and/or based on experience and/or simulations. That is, the entries (precoder matrices) of the codebook may be selected based on e.g. experience and/or simulations, or using an optimization function that, for the case of SU-MIMO, finds the precoder matrices minimizing sidelobes outside the cell, and for the case of MU-MIMO finds the precoder matrices minimizing sidelobes within the cell.

In various embodiments, the first codebook is a first subset of a single codebook and the second codebook is a second subset of the single codebook, and wherein the selecting 12 comprises selecting the first or second subset.

In a variation of the above embodiment, the single codebook comprises a third codebook as a third subset, the third subset comprising a legacy codebook. The possibility to revert to a legacy codebook gives the advantage of the method supporting legacy communication devices not being provided with the first or second codebooks.

In some embodiments, the method 10 comprises signaling, to a communication device 2 which codebook to use. The communication device 2 may then select one precoder from the codebook indicated by the network node 3 and report, to the network node 3, a PMI corresponding to that precoder.

In various embodiments, the method 10 comprises signaling, to a communication device 2, a subset restriction message for restricting the communication device 2 to select entries of the first subset or the second subset of the single codebook. In some radio access technologies, such as for instance LTE, there is an existing "restriction functionality" which may be supported by the method 10. Rather than introducing explicit signaling of which codebook to use, already standardized functionality could be reused, thereby alleviating the corresponding standardization effort. This embodiment would hence facilitate for the communication device 2 to select precoder matrix within a restricted subset of a larger codebook.

In various embodiments, the method 10 comprises requesting the communication device 2 to report a respective preferred precoding matrix indicator, PMI, for each codebook. By requesting the communication device 2 to send two such indicators, the network node 3 may freely select which mode (SU-MIMO or MU-MIMO) to use at the subsequent transmission instant.

In various embodiments, the determining 11 is based on one or more of: load in the cell, load in a neighboring cell and number of communication devices 2 within the cell. If, for instance, the network node 3 has a high load (e.g. many users) and would benefit of using MU-MIMO it may still determine that the SU-MIMO mode should be used and hence select the first codebook in order to reduce interference towards neighboring cells if the neighboring cell load is high.

Figure 5:
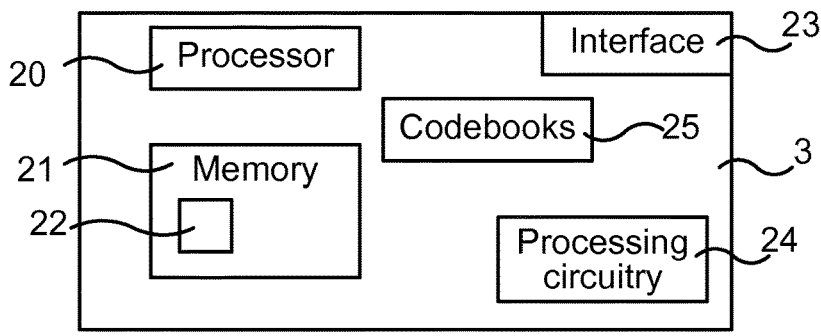
FIG. 5 illustrates schematically a network node and means for implementing embodiments of the method in accordance with the present teachings.

FIG. 5 illustrates schematically a network node 3 and means for implementing embodiments of the method in accordance with the present teachings.

The network node 3 comprises a processor 20 comprising any combination of one or more of a central processing unit (CPU), multiprocessor, microcontroller, digital signal processor (DSP), application specific integrated circuit etc. capable of executing software instructions stored in a memory 21 which can thus be a computer program product. The processor 20 can be configured to execute any of the various embodiments of the method 10 for instance as described in relation to FIG. 4.

The memory 21 of the network node 3 can be any combination of read and write memory (RAM) and read only memory (ROM), Flash memory, magnetic tape, Compact Disc (CD)-ROM, digital versatile disc (DVD), Blu-ray disc etc. The memory 21 may also comprise persistent storage, which, for example, can be any single one or combination of magnetic memory, optical memory, solid state memory or even remotely mounted memory.

The network node 3 comprises an interface 23 for communication with other devices. The interface 23 may, for instance, comprise a protocol stack, for communication with communication devices 2 and/or a protocol stack for communication with other network nodes, e.g. radio access nodes and core network nodes.

The network node 3 may comprise at least a first and a second codebook, indicated at reference numeral 25. The codebooks may be stored in, for instance, a memory within the network node 3, or in an external memory accessible by the network node 3.

The network node 3 may comprise additional processing circuitry, schematically indicated at reference numerals 24 for implementing the various embodiments according to the present teachings. For instance, the network node 3 may comprise processing circuitry implementing precoding schemes.

A network node 3 is provided for selecting codebook. The network node 3 is configured to:
determine whether to use single-user multiple-input-multiple output, SU-MIMO, or multi-user multiple-input-multiple output, MU-MIMO, in a cell C1 controlled by the network node 3, and
select, based on the determining, a first codebook or a second codebook for use in communication with a communication device 2 within the cell C1, wherein the first codebook is adapted for SU-MIMO communication and the second codebook is adapted for MU-MIMO communication.

The network node 3 may be configured to perform the above steps e.g. by comprising one or more processors 20 and memory 21, the memory 21 containing instructions executable by the processor 20, whereby the network node 3 is operative to perform the steps. That is, in an embodiment, a network node 3 is provided for selecting codebook, the network node 3 comprising one or more processors 20 and memory 21, the memory 21 containing instructions executable by the processor 20, whereby the network node 3 is operative to: determine whether to use single-user multiple-input-multiple output, SU-MIMO, or multi-user multiple-input-multiple output, MU-MIMO, in a cell controlled by the network node, and select, based on the determining, a first codebook or a second codebook for use in communication with a communication device within the cell, wherein the first codebook is adapted for SU-MIMO communication and the second codebook is adapted for MU-MIMO communication.

In an embodiment, the first codebook is adapted for SU-MIMO communication by comprising precoder matrices minimizing sidelobes outside the cell C1.

In various embodiments, the second codebook is adapted for MU-MIMO communication by comprising precoder matrices minimizing sidelobes within the cell C1.

In various embodiments, the first codebook is a first subset of a single codebook and the second codebook is a second subset of the single codebook, and the network node 3 is configured to select the first or second subset.

In a variation of the above embodiment, the single codebook comprises a third codebook as a third subset, the third subset comprising a legacy codebook.

In some embodiments, the network node is configured to signal, to a communication device 2 which codebook to use.

In various embodiments, the network node 3 is configured to signal, to a communication device 2, a subset restriction message for restricting the communication device 2 to select entries of the first subset or the second subset of the single codebook.

In various embodiments, the network node 3 is configured to request the communication device 2 to report a respective preferred precoding matrix indicator, PMI, for each codebook.

In various embodiments, the network node 3 is configured to determine whether to use SU-MIMO or MU-MIMO based on one or more of: load in the cell, load in a neighboring cell and number of communication devices 2 within the cell.

The present teachings also encompass a computer program 23 for a network node 3 for selecting codebook. The computer program 22 comprises computer program code, which, when executed on at least one processor on the network node 3, causes the network node 3 to perform the method 10 according to any of the described embodiments.

The present teachings also encompass computer program products 21 for a network node 3. The computer program product 21 comprises a computer program 22 for implementing the embodiments of the methods as described, and a computer readable means on which the computer program 22 is stored. The computer program product, or the memory, thus comprises instructions executable by the processor 20. Such instructions may be comprised in a computer program, or in one or more software modules or function modules. The computer program product 21 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 6:
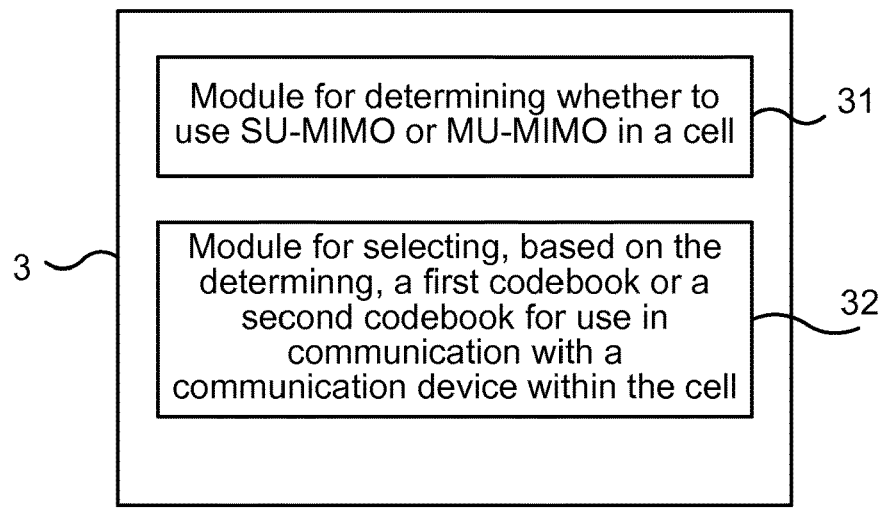
FIG. 6 illustrates a network node comprising function modules/software modules for implementing embodiments of the present teachings.

FIG. 6 illustrates a network node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described.

As should be clear from the description, the present teachings suggest designing two different codebooks, one for SU-MIMO and one for MU-MIMO. The codebook for SU-MIMO is designed such that the side-lobes of the precoding beams are suppressed outside the coverage area of the cell, while for MU-MIMO the side lobe levels of the precoding beams are suppressed within the coverage area of the cell. By switching between these codebooks depending on whether SU-MIMO or MU-MIMO is used, interference is highly reduced. The performance of the user devices is thereby increased, and thereby also user satisfaction.

A network node is provided for selecting codebook. The network node comprises a first module 31 for determining whether to use single-user multiple-input-multiple output, SU-MIMO, or multi-user multiple-input-multiple output, MU-MIMO, in a cell controlled by the network node. Such first module 31 may, for instance, comprise processing circuitry adapted to determine transmission mode (SU-MIMO or MU-MIMO) to use. The first module 31 may comprise processing circuitry adapted to receive an input, e.g. cell load, and adapted to determine transmission mode based thereon.

The network node comprises a second module 32 for selecting, based on the determining, a first codebook or a second codebook for use in communication with a communication device within the cell, wherein the first codebook is adapted for SU-MIMO communication and the second codebook is adapted for MU-MIMO communication. Such second module 32 may, for instance, comprise processing circuitry adapted to select between two or more codebooks.

It is noted that one or both of the modules 31, 32 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of selecting a codebook, the method being performed in a network node, the method comprising:
   determining whether to utilize one of a single-user multiple-input-multiple output, SU-MIMO, codebook and a multi-user multiple-input-multiple output, MU-MIMO, codebook in a cell (C1) controlled by the network node, whether to utilize the SU-MIMO codebook or the MU-MIMO codebook being based on a level of intra-cell interference and being further based on one of an average traffic load and an instantaneous traffic load in neighboring cells;
   selecting, based on the determining, one of a first codebook and a second codebook for utilizing in communication with a communication device within the cell (C1), the first codebook being configured for SU-MIMO communication and the second codebook being configured for MU-MIMO communication;
   when the first codebook is selected, adapting the first codebook to minimize sidelobes created by precoding beams that fall outside the cell (C1); and
   when the second codebook is selected, adapting the second codebook to minimize sidelobes created by precoding beams that fall within the cell (C1).

2. The method of claim 1, wherein the first codebook is a first subset of a single codebook and the second codebook is a second subset of the single codebook, and wherein the selecting comprises selecting one of the first and second subset.

3. The method of claim 2, wherein the single codebook comprises a third codebook as a third subset, the third subset comprising a legacy codebook.

4. The method of claim 1, further comprising signaling, to the communication device which codebook to use.

5. The method of claim 4, further comprising signaling, to the communication device, a subset restriction message for restricting the communication device to select entries one of a first subset and a second subset of a single codebook.

6. The method of claim 1, further comprising requesting the communication device to report a respective preferred precoding matrix indicator, PMI, for each codebook.

7. The method of claim 1, wherein the determining is based on at least one selected from the group consisting of: load in the cell, load in a neighboring cell and number of communication devices within the cell.

8. A non-transitory computer storage medium storing an executable computer program for a network node for selecting a codebook, the computer program comprising computer program code, which, when executed on at least one processor on the network node causes the network node to:
   determine whether to utilize one of a single-user multiple-input-multiple output, SU-MIMO, codebook and a multi-user multiple-input-multiple output, MU-MIMO, codebook in a cell (C1) controlled by the network node, whether to utilize the SU-MIMO codebook configured or the MU-MIMO codebook being based on a level of intra-cell interference and being further based on one of an average traffic load and an instantaneous traffic load in neighboring cells;
   select, based on the determination, one of a first codebook and a second codebook for utilizing in communication with a communication device within the cell (C1), the first codebook being configured for SU-MIMO communication and the second codebook being configured for MU-MIMO communication;
   when the first codebook is selected, adapt the first codebook to minimize sidelobes created by precoding beams that fall outside the cell (C1); and
   when the second codebook is selected, adapt the second codebook to minimize sidelobes created by precoding beams that fall within the cell (C1).

9. A network node for selecting a codebook, the network node being configured to:
   determine whether to utilize one of single-user multiple-input-multiple output, SU-MIMO, codebook and a multi-user multiple-input-multiple output, MU-MIMO, codebook in a cell (C1) controlled by the network node, whether to utilize the SU-MIMO codebook or the MU-MIMO codebook being based on a level of intra-cell interference and being further based on one of an average traffic load and an instantaneous traffic load in neighboring cells;
   select, based on the determination, one of a first codebook and a second codebook for utilizing in communication with a communication device within the cell (C1), the first codebook being configured for SU-MIMO communication and the second codebook being configured for MU-MIMO communication;
   when the first codebook is selected, adapt the first codebook to minimize sidelobes created by precoding beams that fall outside the cell (C1); and
   when the second codebook is selected, adapt the second codebook to minimize sidelobes created by precoding beams that fall within the cell (C1).

10. The network node of claim 9, wherein the first codebook is a first subset of a single codebook and the second codebook is a second subset of the single codebook, and wherein the network node is configured to select one of the first and second subset.

11. The network node of claim 10, wherein the single codebook comprises a third codebook as a third subset, the third subset comprising a legacy codebook.

12. The network node of claim 9, further configured to signal, to a communication device which codebook to use.

13. The network node of claim 12, configured to signal, to a communication device, a subset restriction message for restricting the communication device to select entries one of a first subset and a second subset of a single codebook.

14. The network node of claim 9, further configured to request the communication device to report a respective preferred precoding matrix indicator, PMI, for each codebook.

15. The network node of claim 9, wherein the determining is based on at least one selected from a group consisting of: load in the cell, load in a neighboring cell and number of communication devices within the cell.

* * * * *